T. R. HIGDON.
ASH PAN.
APPLICATION FILED MAR. 26, 1909.

960,174.

Patented May 31, 1910.

Witnesses
Harry R. Bowman
G. E. Small

Inventor
T. R. Higdon
By D. Swift & Co.
Attorneys

UNITED STATES PATENT OFFICE.

THOMAS R. HIGDON, OF REPTON, ALABAMA.

ASH-PAN.

960,174.

Specification of Letters Patent.

Patented May 31, 1910.

Application filed March 26, 1909. Serial No. 486,054.

*To all whom it may concern:*

Be it known that I, THOMAS R. HIGDON, a citizen of the United States, residing at Repton, in the county of Conecuh and State of Alabama, have invented a new and useful Ash-Pan; and I do hereby declare the following to be a full, clear, and exact description of the invention, such as will enable others skilled in the art to which it appertains to make and use the same.

The invention relates to an ash pan, and has for its object to provide a simple, efficient and durable device of this character adapted to promote the convenience of housekeepers in managing their fires.

With these and other objects in view, the invention consists of the novel construction and arrangement of parts hereinafter described and shown and particularly pointed out in the appended claims.

Figure 4:
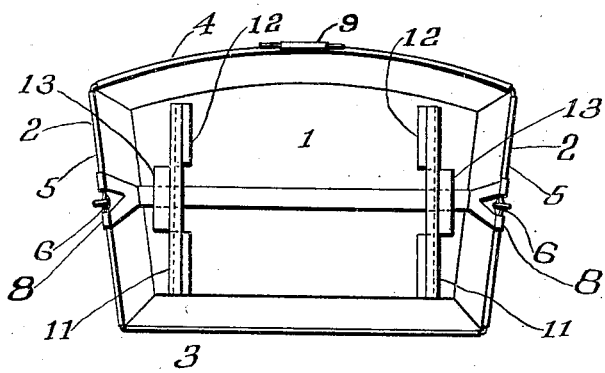
Figures 2, 5:
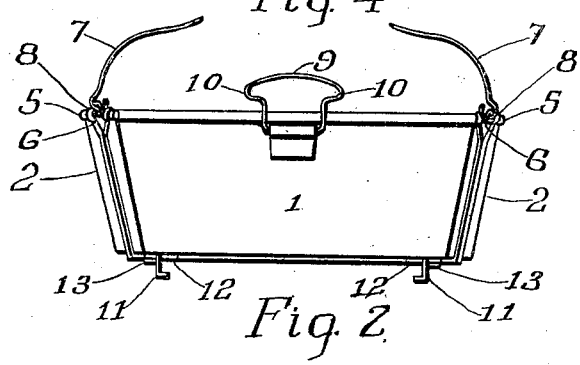
Figure 1:
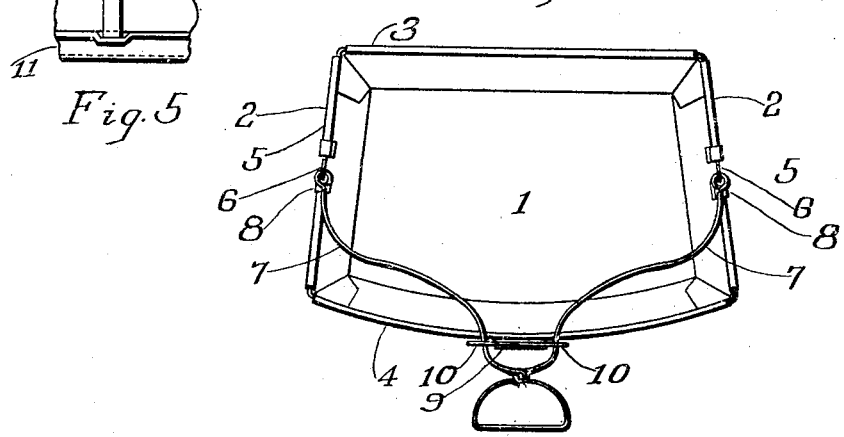
Figure 3:
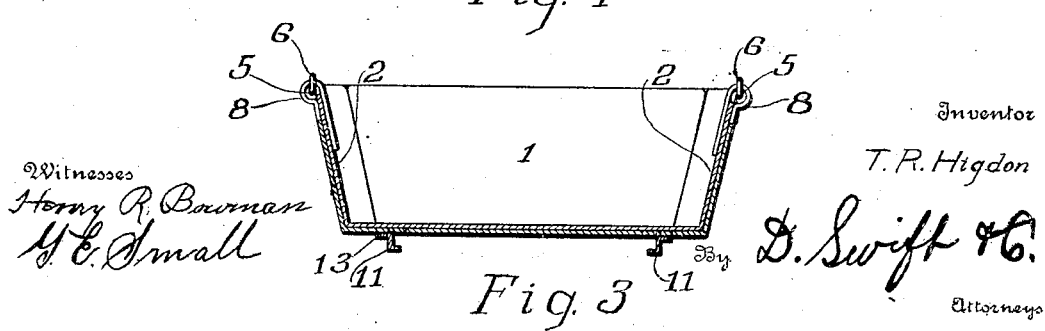

In the drawings: Figure 1 is a plan view of an ash pan constructed in accordance with this invention. Fig. 2 is a side elevation. Fig. 3 is a longitudinal sectional view. Fig. 4 is an inverted plan view. Fig. 5 is a fragmentary detail view in side elevation, of a portion of the pan.

Referring to the drawings, 1 designates an ash pan constructed of sheet metal or other suitable material having sides 2 and a rear 3 and a front 4, all formed integrally of a single piece of metal. The periphery of the device is provided with a wire member 5 which is held in place by the upper parts being rolled thereover. On each side of the device, the wire forms a loop 6 into which a handle 7 is inserted. In order to prevent the handle from breaking the wire through the rolled portion, reinforcing members 8 are provided, a pair at each side of the pan, which are disposed on opposite sides of the loops 6, and form the terminals of a band, which extends down the sides and beneath the bottom of the pan and thus reinforces the latter. The handle 7 is designed to be used when the ash pan is being handled or carried from place to place. A grip or loop 9 is mounted on the front part of the ash pan for handling the same while it is under the fire. The handle 7 is adapted to frictionally engage the loop 9 at the indented portion 10, which will prevent the handle 7 from becoming accidentally disengaged from the members 6 when the device is not in use. In order to save the wear and tear of the device, a pair of supporting members 11 is arranged on the bottom having oppositely disposed members 12 and 13. It will be seen that in taking the pan out and in the bottom will be greatly preserved by these members being exposed to the wear and tear of constant use, instead of the pan itself.

What is claimed is:

1. An ash pan of the class described consisting of a single piece of metal bent upwardly at the sides, front and rear, said bent portions being provided with a supporting wire, said bent portions being rolled over said wire, said wire being formed into a pair of loops, and adapted to be engaged by a handle, a grip or loop mounted on the front of said device and adapted to frictionally engage said handle.

2. An ash pan, consisting of a single piece of metal, having its side and end portions inclined and provided at its edges with a reinforcing wire, formed into loops, a band passing beneath the bottom of the pan and against the sides and having its terminals bifurcated and rolled over the wired edge to reinforce the loops and a handle in engagement with the loops.

In testimony whereof I have signed my name to this specification in the presence of two subscribing witnesses.

THOMAS R. HIGDON.

Witnesses:
   J. R. SIMMONS,
   G. W. THOMPSON.